United States Patent [19]

Naito et al.

[11] Patent Number: 4,613,872
[45] Date of Patent: Sep. 23, 1986

[54] RECORDER FOR SIDE-BY-SIDE DIGITAL RECORDING OF ANALOG DATA AND DIGITAL DATA

[75] Inventors: Hiroyuki Naito; Masahiro Tohara, both of Fuchu, Japan

[73] Assignee: Kabushiki Kaisha Toshiba, Kawasaki, Japan

[21] Appl. No.: 654,468

[22] Filed: Sep. 26, 1984

[30] Foreign Application Priority Data

Sep. 26, 1983 [JP] Japan .................................. 58-176490

[51] Int. Cl.$^4$ ............................................ G01D 9/32
[52] U.S. Cl. ...................................... 346/1.1; 346/34; 346/35; 346/76 PH; 346/136; 346/520
[58] Field of Search ............... 346/76 PH, 35, 136, 346/1.1, 50, 33 R, 34; 364/518, 519, 520

[56] References Cited

U.S. PATENT DOCUMENTS 3,971,041  7/1976  Mason ................... 346/76 PH
4,224,628  9/1980  Murray .................. 346/76 PH
4,249,186  2/1981  Edwards ................... 346/35
4,346,390  8/1982  Allen ..................... 346/76 PH

FOREIGN PATENT DOCUMENTS 59-60220  4/1984  Japan .

Primary Examiner—Joseph W. Hartary
Attorney, Agent, or Firm—Oblon, Fisher, Spivak, McClelland & Maier

[57] ABSTRACT

A recorder which records analog input waveforms and converts analog input data into digital data at regular intervals and at selected times records the digital data in the form of a list of data along side of the analog input waveforms together with the time and other information. When analog waveforms and characters are recorded in side-by-side relation, the speed at which the paper is fed is changed from that employed when only analog waveforms are recorded, whereby the list of data can be quickly recorded.

4 Claims, 5 Drawing Figures

RECORDER FOR SIDE-BY-SIDE DIGITAL RECORDING OF ANALOG DATA AND DIGITAL DATA

BACKGROUND OF THE INVENTION

1. Field of the Invention:

The present invention relates to a recorder and, more particularly, to a recorder which usually makes a record of analog waveforms and which, when certain conditions occur, functions to make a record of both analog waveforms and a list of data in side-by-side relation.

2. Description of the Prior Art:

Recorders which record analog waveforms and also record all input data previously obtained during a given period of time in the form of a list at a certain time have the disadvantage that the recording of the analog waveforms is usually interrupted. Other recorders have been manufactured which compress analog waveforms and make a record thereof in side-by-side relation to a list of data. However, the recorders of this type take a long time to print characters, because this printing operation is performed in step with the recording of analog waveforms.

SUMMARY OF THE INVENTION

Accordingly, an object of the present invention is to provide a recorder which is capable of recording analog data and digital data simultaneously in a readable form.

Another object of this invention is to provide a recorder which is capable of quickly printing characters without interrupting the recording of analog waveforms.

A further object of this invention is to provide a recorder which makes a record of analog waveforms in step with printing of characters and which is capable of changing the speed at which the paper is fed during the printing of characters.

These and other objects are achieved, in accordance with the teachings of the present invention, by providing a novel recorder in which, when simultaneous recording of analog waveforms and printing of characters is performed, the paper is fed at a speed different from that employed when only the recording of analog waveforms is performed.

More particularly, according to the present invention there is provided a recorder including an analog-to-digital converter for converting analog input data into digital form; a sampling time setting section for setting the time at which input data is to be sampled and for delivering an instruction each time the input data is to be sampled; a list form converter section for sampling the output from the analog-to-digital converter under the control of the instruction from the sampling time setting section and for converting the sampled digitial output into a list of data; a memory for storing the output from the list form converter section; a gate disposed in the output line of the memory; an analog waveform recording condition setting section to which first recording conditions to be imposed during the recording of analog waveforms are set; a data list recording condition setting section to which second recording conditions to be imposed during the printing of a list of data are set; a recording control section for receiving the output from the analog-to-digital converter, the first and second recording conditions and an output from the memory via the gate, and for delivering output data in conformity with a selected of the first and second recording conditions; and a data list output control section which, when the recording of a list of data is initiated, enables said gate and changes the selection of the recording conditions imposed on the recording control section from the first recording conditions to the second recording conditions, and which, when the recording of the list is finished, disenables said gate and changes the selection of recording conditions imposed on the recording control section back to the first recording conditions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
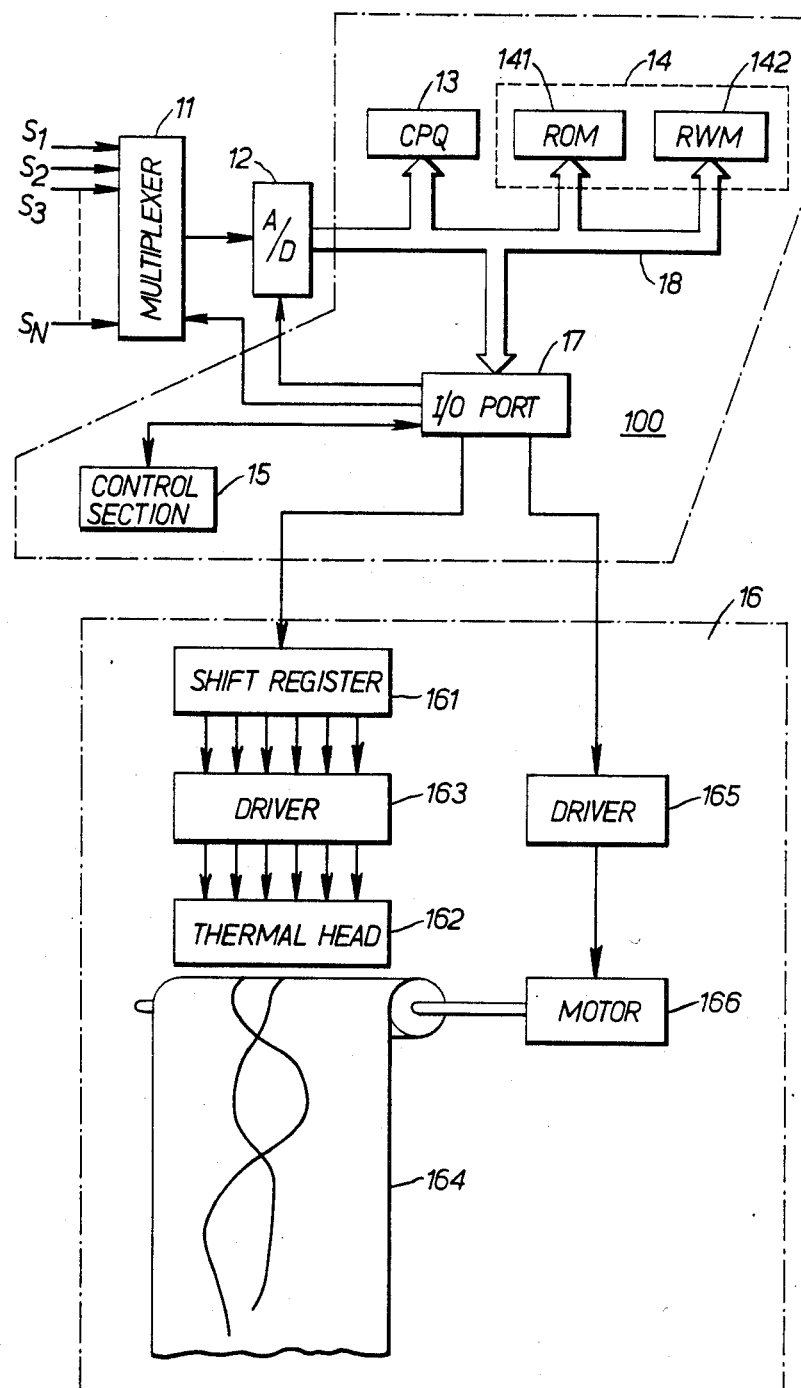
FIG. 1 is a block diagram of a recorder according to the present invention.

Referring now to the drawings, wherein like reference numerals designate identical or corresponding parts throughout the several views, and more particularly to FIG. 1 thereof, there is shown a thermal printer apparatus of the multi-stili type according to the present invention. This apparatus includes an analog multiplexer 11, an analog-to-digital converter 12 for converting the analog data from the multiplexer 11 into digital form, a central processing unit 13 for processing data, a memory 14, a control section 15, a recording system 16, and an input/output port 17 through which requisite data is transmitted to and from the components 11, 12, 15, 16, etc. The multiplexer 11 rapidly accepts all of, or an arbitrary number of, input data items S1, S2, ..., SN from a number of channels one by one in a predetermined sequence. The control section 15 serves to designate the display of either the input data or alarm or both for each channel. The recording system 16 makes a record of input data, indication of alarm, etc. on a paper.

The memory 14 includes of a read-only memory 141 for storing a program that causes data to be processed in a predetermined sequence and a read-write memory 142 for storing the values set for alarm for the channels specified by the control section 15. The memory 142 further acts to compare its input data, i.e., the data delivered from the A/D converter 12 after being processed by the CPU 13 in accordance with the program stored in the ROM 141, with each of said values set for alarm. When the value of the input data exceeds the value set for alarm, the read-write memory 142 converts both the input data and the value set for alarm into a pattern in the form suitable for printing of characters and then outputs the converted pattern of data. Thus, the read-write memory 142 incorporates a buffer having a storage capacity corresponding to the number of the head elements of the thermal head mounted in the recording system 16. The buffer prepares a character pattern to be printed at regular intervals and transfers the preferred character pattern to the recording system 16 under the direction of the CPU 13.

The recording system 16 is composed of a shift register 161, a driver 163 for driving the head elements of the thermal head 162 in accordance with the signals delivered in parallel from the shift register 161, a heat-sensitive paper 164, and a driver 165 which controls an electric motor 166 so that the paper 164 may be shifted at a predetermined velocity. The shift register 161 serially receives data defining a character pattern to be printed from the read-write memory 142 via the input/output port 17 and successively stores the data.

In the operation of the apparatus constructed as described above, an executable program is first stored in the ROM 141. The control section 15 stores the value set for alarm for each channel in the read-write memory 142 and causes the memory 142 to indicate the recording of the values set for alarm and either the recording of the input data or display of alarm or both. Then, an initial pattern is stored in the read-write memory 142 or the ROM 141 to permit the patterns of abscissa and ordinate for data recorded on the paper and a line pattern for the indication of alarm to be previously recorded as the paper is transferred.

After the apparatus is set to the prescribed condition as described above, the CPU 13 generates a scan signal in accordance with a program, the scan signal being fed to the analog multiplexer 11 through the input/output port 17. This causes the multiplexer 11 to rapidly accept the input data items S1, S2, ..., SN for each channel in a predetermined sequence, and then the data for each channel are furnished to the A/D converter 12 for conversion into digital form. The digitized data from the A/D converter 12 is then processed by the CPU 13 in accordance with the program held in the ROM 141. The resultant data is sent to the read-write memory 142, which then compares the input data from the CPU 13 with the value set for alarm. When the input data is no greater than the value set for alarm, only the data indicating a pattern for printing of characters is generated. When the input data is in excess of the value, input data is produced as well as the data indicating the pattern for printing. Then, the data is stored in a buffer that has a storage capacity corresponding to the number of the head elements. Of course, the initial pattern is stored in the buffer at the same time. The data, which is indicative of the pattern for printing of characters and has been stored in the buffer, is read out in succession by the instructions of the CPU 13 and fed through the input/output port 17 to the shift register 161 of the recording system 16. The data indicating the printing of characters is then output in parallel from the register 161, and is applied to the driver 163 to activate the head elements in the thermal head 162. Since these processings are performed rapidly for each channel, it is possible to record data on the paper using the thermal head 162.

Figure 2:
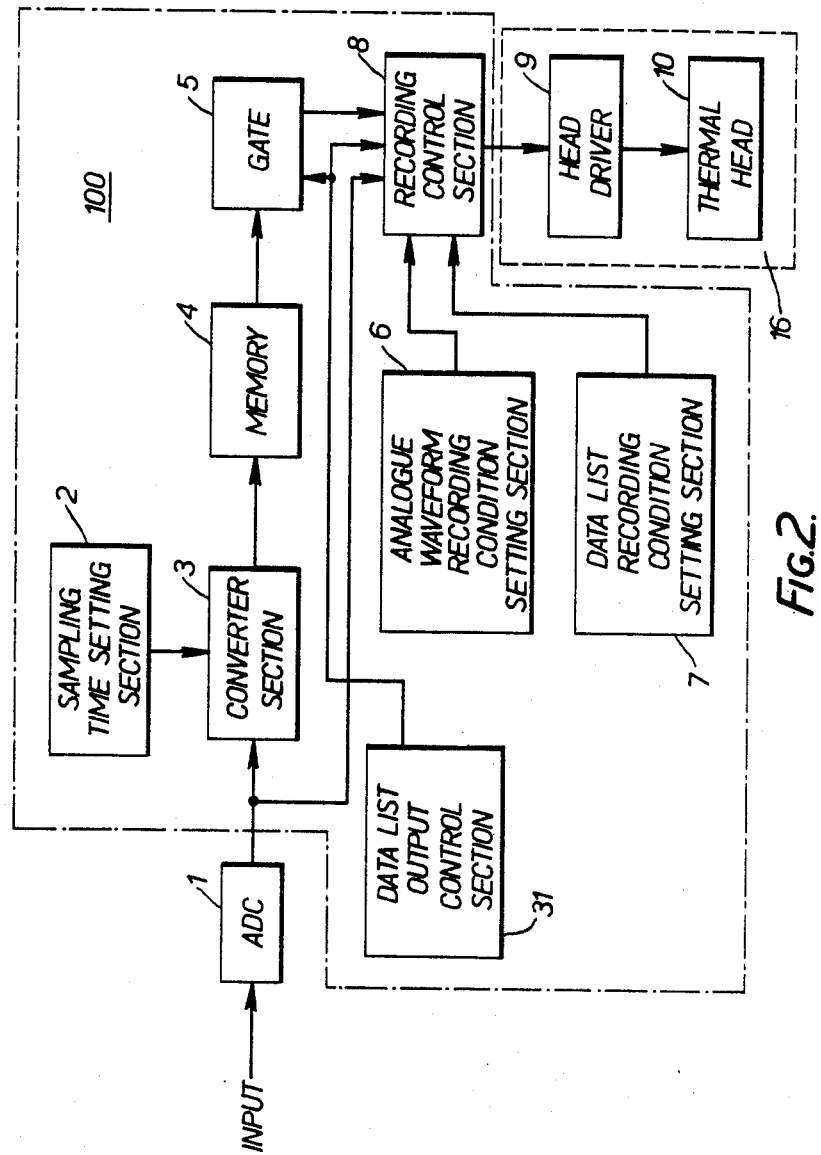
FIG. 2 is a block diagram for illustrating the functions of various components of the recorder shown in FIG. 1.

The functions of the recorder shown in FIG. 1 are next described by referring to FIG. 2, where there is shown an analog-to-digital converter 1 which converts its analog input into digital form. The time intervals at which the input data to be printed in the form of a list of data is to be sampled is set by a sampling time setting section 2 which delivers a sampling instruction in order that the input is sampled at each hour, for example. A list form converter section 3 samples the output from the A/D converter 1 under the direction of the sampling time setting section 2 and converts the sampled output into the form of a data list. The output from the converter section 3 is stored in a memory 4. A gate 5 is disposed in the output line from the memory 4.

Recording conditions such as an interval of 100 mm between the successive lines of a scale used during recording of analog waveforms and a feed speed of the chart of 20 mm/min. are set at an analog waveform recording condition setting section 6. The recording conditions imposed when a list of data is also to be recorded, such as an interval of 60 mm between the successive lines of a scale used during recording of a data list, a list format that determines the form of the list of data recorded, and a feed speed of the chart of 120 mm/min., are set at a data list recording condition setting section 7. The output from the A/D converter 1 is applied to a recording control section 8. Also, the output from the memory 4 is supplied via the gate 5 to the recording control section 8, which delivers data indicating the interval between the lines of the scale and the list format according to the recording conditions imposed by either the recording condition setting section 6 or 7. A head driver 9 activates a thermal head 10 in response to the output from the recording control section 8, thus performing a recording operation.

A data list output control section 31 includes a clock which determines when a data list is to be printed. When the clock reaches a previously set time, for example eight o'clock or twenty o'clock, at which time the list of data starts to be printed, the recording control section 8 is switched from the analog waveform recording condition setting section 6, which was furnishing the recording conditions to the recording control section 8, to the data list recording setting section 7. At the same time, the output control section 31 enables the gate 5, which transfers the data list stored in the memory 4 to the control section 8. When the end of the data list is transferred from memory 4, the recording conditions supplied to the recording control section 8 are replaced by the recording conditions established for recording of analog waveforms. At the same time, the gate 6 is disenabled. The end of the data list is determined by both the time taken to print the list of data and the beginning time of the recording of the list. The time taken to print the list depends on the number of lines of the list to be printed and also on the feed speed of the paper. The sampling time setting section 2, the list form converter section 3, the memory 4, the gate 5, the analog waveform recording condition setting section 6, the data list recording condition setting section 7, the recording control section 8, and the data list output control section 31 functionally correspond to the block 100 shown in FIG. 1.

The operation of the recorder having the functions as shown in FIG. 2 is now described. Suppose that the recorder is now printing a record of analog waveforms. Under this condition, the gate 5 is disenabled, and the recording conditions for analog waveforms, i.e., the interval of 100 mm between the lines of the scale and the feed speed of the paper of 20 mm/min. are imposed on the recording control section 8 by the analog waveform recording condition setting section 6. The condition of the feed speed of 20 mm/min. is also imposed on a paper feed control section (not shown) to control the time interval between the successive pulses that energize a stepper motor for feeding the paper such that paper is fed at a speed of 20 mm/min. The digitized data from the A/D converter 1 is supplied to the recording control section 8, which then delivers to the head driver 9 an output presenting the input data in analog form at a scale for making a record having the line interval, or line width, of 100 mm. The driver 9 drives the thermal head 10 to make a record on the paper. At this time, the manner of printing on the paper is shown in the upper portion of the chart 20 shown in FIG. 3. Specifically, a scale 23 has a line interval of 100 mm and extends entirely across the chart 20. Two analog waveforms 21 and 22 are drawn corresponding to the input data.

Each hour on the hour, e.g., ten o'clock or eleven o'clock, while such analog waveforms are being printed, the sampling time setting section 2 gives an instruction to the list form converter section 3, which then samples the output from the A/D converter 1 and converts the sampled output into the form of a data list. This is stored in the memory 4. In this way, the input data which is obtained at each hour subsequent to the previous recording of the data list is stored in the memory 4 in the form of a data list.

While the recording operation of analog waveforms is continued, when it becomes the time, for example twenty o'clock, at which a data list is to be printed, the recording conditions that are used by recording control section 8 are changed to those imposed by the data list recording condition setting section 7, by means of the data list output control section 11. This changes the line interval of the scale and the feed speed of the paper to 40 mm and 120 mm/min., respectively. At the same time, the gate 5 is enabled, so that the list of data which was obtained during the preceding twelve hours, for example, and has been stored in the memory 4 is transferred to the recording control section 8. Then, the control section 8 produces an output delivered to the head driver 9 to print a record with a scale having a 40 mm line interval, the printed record including the analog data in digital form and a list of data. The driver 9 drives the thermal head 10 to print the data on the chart, as shown in the intermediate portion of the chart 20 shown in FIG. 3. In particular, the scale 24 consists of lines spaced apart by 40 mm. Two waveforms 21 and 22 corresponding to the input data are printed. Indicated by numeral 25 is a list of input data obtained at twelve successive hours. This list is printed in a space which has been obtained by narrowing the space between the lines of the scale for printing of analog waveforms.

When the end of the data list is reached after passage of a predetermined time taken to print the list of data, the recording conditions used by recording control section 8 are switched from those delivered by condition setting section 7 to the conditions output by the analog waveform recording condition setting section 6, by means of the data list output control section 11. This restores the feed speed of the paper and the interval between the lines of the scale on the paper to 20 mm/min. and 100 mm, respectively. At the same time, the gate 5 is disenabled, thus permitting only the recording of analog waveforms. This state is maintained until the next printing of a data list. Specifically, a scale 23 consisting of lines spaced apart by 100 mm is then recorded. Two analog waveforms 21 and 22 are printed corresponding to the input data.

Figure 4:
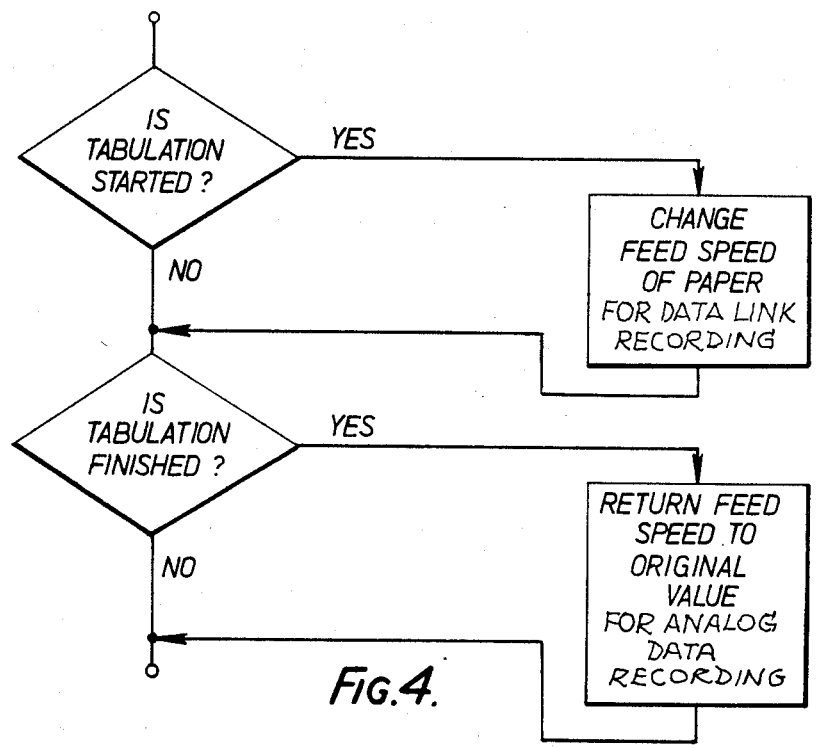
FIG. 4 is a flowchart showing a subroutine involved in the initiation and the termination of a tabulation performed by the recorder shown in FIG. 1.

FIG. 4 is a flowchart illustrating a subroutine for changing the feed speed of the paper at the beginning and the end of a character-printing operation performed by the recorder.

Figure 5:
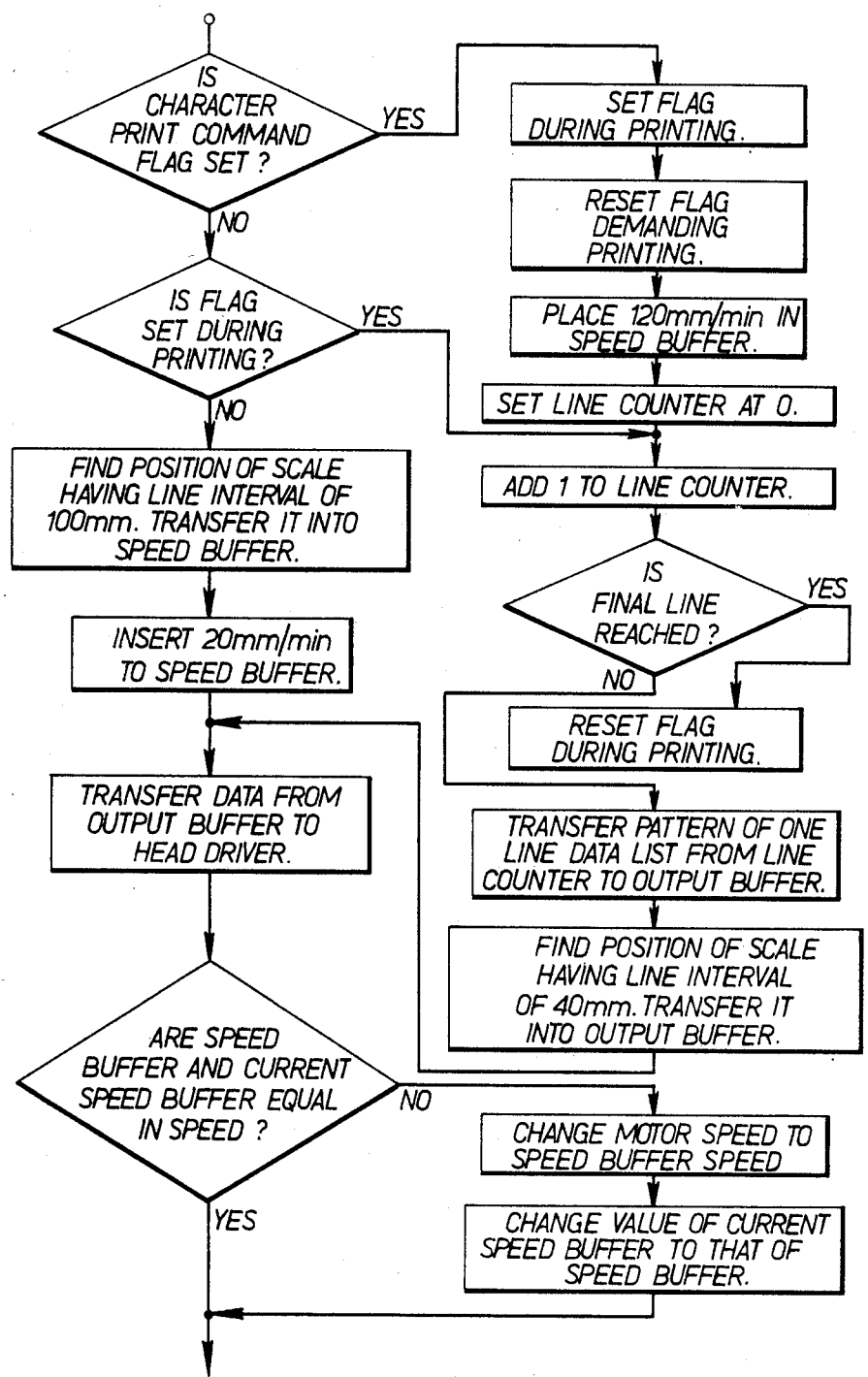
FIG. 5 is a flowchart showing the character printing operation performed by the recorder shown in FIG. 1.

FIG. 5 is a flowchart illustrating a subroutine for printing characters on the paper. In this subroutine, a character-print command flag is detected by the data list control section 31. An output buffer and a speed buffer are incorporated in the recording control section 8.

As thus far described, in the recorder according to the present invention, the list of data and analog waveforms are printed on the chart in side-by-side relation by narrowing the interval between the lines of the scale for printing of analog waveforms. Further, it is possible to greatly shorten the time taken to print the list of data, by increasing the feed speed of the paper greatly, when such a simultaneous printing method is adopted.

The present invention is not limited to the above embodiment, and the following modified embodiments are also possible.

Figure 3:
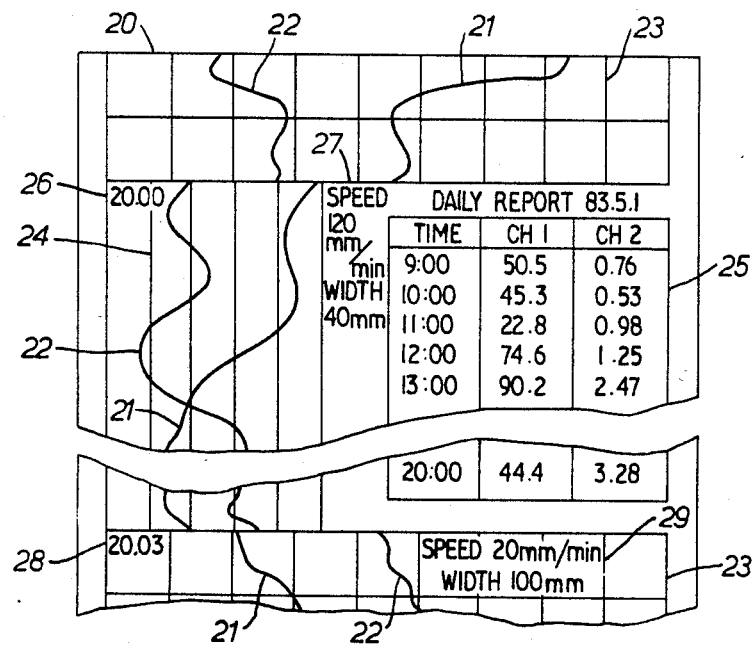
FIG. 3 is a plan view of the paper of the recorder shown in FIG. 1, illustrating the condition of print made on the paper.

As a first modified embodiment, when printing of a list of data is initiated, the data list output control section 11 transmits data about the beginning time of the printing to the data list recording condition setting section 7, which then delivers signals to the recording control section 8 to print the beginning time, the feed speed of the paper during the printing of the list, and the intervals between the lines of the scale. When the mode is restored from data list recording to analog waveform recording, the data list output control section 11 transmits data to the analog waveform printing condition setting section 6 for the time at which the analog waveform recording mode is resumed. Then, the setting section 6 sends signals to the recording control section 8 to print the time at which the original mode was resumed, the feed speed of the paper during the analog waveform recording operation, and the interval between the lines of the scale. In this case, as shown in FIG. 3, the hour 20:00 at which the printing of a list of data is initiated is recorded at the front end 26 of the chart 20. Also, the recording conditions "SPEED 120 mm/min." and "WIDTH 40 mm" are printed at position 27. Further, the time 20:03 at which the analog waveform printing operation was resumed is printed at the initial position 28 on the chart 20. The recording conditions "SPEED 20 mm/min." and "WIDTH 10 mm" during the analog waveform recording operation are printed at the initial position 29. Thus, the user can later readily check and interpret the chart.

As a second modified example, a panel may be mounted which is used solely to permit the feed speed of the paper during the data list recording operation to be freely changed by itself.

According to the present invention, when the recording operation is switched to the condition in which a list of data and analog waveforms are simultaneously recorded in side-by-side relation by a data list output control section, the feed speed of the paper is greatly increased, whereby the time taken to record a list of data can be greatly shortened. Analog waveforms for which the lines of the scale are made closer can be printed only for a short time, enhancing the reliability of the recording of analog waveforms. Also, the time at which the printing of a list of data is started, the speed of the paper transported at that time, and the interval between the lines of the scale are recorded on the chart at the beginning of the recording of the list. Additionally, the time at which the analog waveform printing mode is resumed, the speed of the paper transported when analog waveforms are printed, and the intervals between the lines of the scales are printed on the paper when the analog waveform recording mode is resumed. Consequently, the recorder is user convenient, because the user can later readily check and interpret the data on the paper printout.

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of the United States is:

1. A recorder comprising:
   an analog-to-digital (A/D) converter for converting analog input data into a digital output;
   a sampling time setting section for setting times at which the digital output of the A/D converter is to be sampled and for delivering an instruction at each of said sampling times;
   a list form converter section for sampling the digital output from the A/D converter under the control of said instruction delivered by the sampling time setting section and for converting the sampled digital output into a list of data;
   a memory for storing the list of data converted by the list form converter section;
   a gate disposed in an output line from the memory;
   an analog waveform recording condition setting section for setting first recording conditions, including a first paper feed speed, to be imposed during the recording of analog waveforms;
   a data list recording condition setting section for setting second recording conditions, including a second paper feed speed which is faster than said first paper feed speed, to be imposed during the printing of a list of data;
   a recording control section for receiving said digital output from the analog-to-digital converter, said first and second recording conditions and an output from the memory via said gate, and for delivering output data in conformity with a selected of said first and second recording conditions;
   a data list output control section which, when the recording of a list of data is initiated, enables said gate and changes the selection of recording conditions imposed on the recording control section from the first recording conditions to the second recording conditions, and which, when the recording of the list is finished, disenables said gate and changes the selection of the recording conditions imposed on the recording control section back to the first recording conditions;
   a thermal head;
   means for feeding recording paper to said thermal head at either said first paper feed speed or said second paper feed speed as determined by said data list output control section; and
   a head driver that drives said thermal head in response to the output data from the recording control section to make a record.

2. A recorder as set forth in claim 1, comprising:
   said data list output control section comprising means for delivering data indicative of a beginning time of the recording of the list to the data list recording condition setting section when the recording of the list is initiated and means for delivering data indicative of the time at which the analog waveform recording operation is resumed to the analog waveform recording condition setting section when the recorder is switched from the data list recording operation to the analog waveform recording operation;
   said data list recording condition setting section comprising means for delivering signals to print the beginning time, the feed speed of the paper, and the interval between successive lines of a scale, and
   said analog waveform recording condition setting section comprising means for delivering signals to the recording control section to print the time at which the original mode of operation is resumed, the feed speed of the paper, and the interval between the successive lines of a scale.

3. A method of recording analog input waveforms and at predetermined times also recording at regular intervals a list of previously obtained digital input data in the form of characters, comprising:
   preprogramming a first paper feed speed for recording in side-by-side relation of analog waveforms and characters and a different second feed speed for recording data in the form of only analog waveforms;
   recording the analog waveforms and characters in side-by-side relation at said first paper feed speed; and
   automatically changing paper feed speed from said first preprogrammed paper feed speed to said second paper feed speed after recording of said analog waveforms and characters in side-by-side relation;
   recording data in the form of only analog waveforms at said second paper feed speed.

4. A method according to claim 3, further comprising:
   changing a scale of the recording when changing from recording of only analog waveforms to recording of analog waveforms and characters.

* * * * *